United States Patent
Chin et al.

(10) Patent No.: US 7,948,882 B2
(45) Date of Patent: May 24, 2011

(54) DUAL LEAKY BUCKET FLOW CONTROL METHOD AND SYSTEM

(75) Inventors: Ken Chin, Saratoga, CA (US); Edgar Chung, Belmont, CA (US); Gopal Madhava Rao, Santa Clara, CA (US)

(73) Assignee: Agere Systems Inc., Allentown, PA (US)

( * ) Notice: Subject to any disclaimer, the term of this patent is extended or adjusted under 35 U.S.C. 154(b) by 915 days.

(21) Appl. No.: 11/539,768

(22) Filed: Oct. 9, 2006

(65) Prior Publication Data
US 2008/0084824 A1    Apr. 10, 2008

(51) Int. Cl.
G01R 31/08    (2006.01)
H04L 12/28    (2006.01)
G06F 15/173   (2006.01)

(52) U.S. Cl. .............. 370/230; 370/235.1; 370/252; 370/395.4; 709/223

(58) Field of Classification Search ........... 370/235.1; 3/235.1
See application file for complete search history.

(56) References Cited

U.S. PATENT DOCUMENTS

| | | | | |
|---|---|---|---|---|
| 5,311,513 A * | 5/1994 | Ahmadi et al. | | 370/230 |
| 5,831,971 A | 11/1998 | Bonomi et al. | | |
| 2001/0030967 A1 * | 10/2001 | Kyusojin et al. | | 370/395 |
| 2003/0174650 A1 * | 9/2003 | Shankar et al. | | 370/235 |
| 2004/0213156 A1 * | 10/2004 | Smallwood et al. | | 370/232 |
| 2005/0120102 A1 * | 6/2005 | Gandhi et al. | | 709/223 |
| 2005/0232150 A1 * | 10/2005 | Nishimura | | 370/230 |
| 2008/0123689 A1 * | 5/2008 | Oren et al. | | 370/468 |

OTHER PUBLICATIONS

Guffens et al., "Using token leaky bucket for congestion feedback in packet switched network with guaranteed boundedness of buffer queues", Dec. 3, 2002 at http://www.auto.ucl.ac.be/~guffens/, 26 pages.

Krommenacker et al., "Designing, Modelling and Evaluating Switched Ethernet Networks in Factory Communication Systems", 2002 at http://hurray.isep.ipp.pt/activities/rtlia2002/Full_papers/14_rtlia.pdf, 14 pages.

* cited by examiner

*Primary Examiner* — Huy D Vu
*Assistant Examiner* — Brandon Renner
(74) *Attorney, Agent, or Firm* — Mendelsohn, Drucker & Associates, P.C.; Yuri Gruzdkov; Steve Mendelsohn

(57) ABSTRACT

A method for scheduling a network resource comprises adding tokens to first and second accumulators at first and second fill rates, respectively. A number of tokens corresponding to a size of a packet is subtracted from the first accumulator and a highest priority is assigned to a queue with which the packet is associated, if a number of tokens in the first accumulator is greater than zero. The number of tokens is subtracted from the second accumulator, and a default priority assigned to the queue, if the number of tokens in the first accumulator is less than zero and a number of tokens in the second accumulator is greater than zero. The network resource is assigned for transmission of the packet from the queue using a schedule that is based on the priority assigned to the queue. The packet is transmitted using the assigned network resource.

31 Claims, 4 Drawing Sheets

DUAL LEAKY BUCKET FLOW CONTROL METHOD AND SYSTEM

FIELD OF THE INVENTION

The present invention relates to communications traffic flow control methods and systems.

BACKGROUND

Open loop flow control mechanisms are used in asynchronous networks, such as Ethernet (802.3) local area networks (LANs) and asynchronous transfer mode (ATM) networks. These mechanisms may include admission control, policing, and traffic shaping. For admission control, when an application requests a network connection, the application identifies its quality of service (QoS) requirements, and the network decides whether to accept or reject the request. In policing, the network monitors the traffic. Packets from any application that introduces more traffic than identified during network connection setup may be discarded, delayed, or shaped.

Traffic shaping changes the traffic flow to smooth bursty traffic. One type of leaky bucket traffic shaper stores incoming packets in a buffer and releases the packets at a desired rate. The buffer size determines the maximum burst size that can be accommodated.

Another leaky bucket shaping method is a token leaky bucket method. This type of model is useful for systems in which the output rate of a network resource is a constant value (e.g., a line transmission rate) when the buffer is not empty. The leaky bucket contains tokens, each of which represents one byte of data. The bucket is filled at a constant interval with a programmable number of tokens. When a packet is scheduled for transmission to an output port, the length of the packet is subtracted from the bucket. Since the fill rate is known and programmed, the state of whether this rate has been exceeded can be determined by looking at the state of the bucket. If the bucket is empty, the output rate is greater than the fill rate. If the bucket is full, the output rate is less than the fill rate.

Dual leaky bucket methods include two independent leaky buckets corresponding to minimum and maximum transmission rates respectively. If a packet is scheduled, tokens are drained independently from both buckets. In the independent leaky bucket approach, if the maximum rate for a queue is set to the line rate and the minimum rate is set to something very low, and large packets are scheduled to this queue over an extended period, the lower leaky bucket will become extremely negative as packets are drained. Eventually, the negative limit of the binary counter for the lower leaky bucket is reached, at which time additional bytes are not taken into account for the minimum rate. This translates into cumulative error. The rate being measured by the lower bucket will be inaccurate, and more inaccurate as these events occur.

For example, consider a loading scenario where the upper delta is set to a maximum line rate (1 Gbps), while the lower delta is set to a very small minimum rate. Jumbo packets are then continuously scheduled to this queue at the full line rate. Since the maximum rate will never be achieved (upper accumulator cannot go negative in one accumulator update period), jumbo frames can be scheduled to this queue indefinitely. Since the full packet length is subtracted from both accumulators, it is clear that the negative limit of the lower accumulator will be reached very quickly and packets that are scheduled after this point in time will not be accounted for. Such a load could cause the lower shaper to become extremely negative. Eventually, the token accounting for the lower shaper would have to be "clipped" in order to avoid accumulator rollover.

Because this rate measuring error is cumulative, the lower shaper would become more and more inaccurate as these types of clipping events occur. In essence, the minimum shaper rate would gradually increase since the accumulator would become positive too soon.

Improved traffic shaping methods and apparatus are desired.

SUMMARY OF THE INVENTION

A method for scheduling a network resource comprises adding tokens to first and second accumulators at first and second fill rates, respectively. A number of tokens corresponding to a size of a packet is subtracted from the first accumulator and a highest priority is assigned to a queue with which the packet is associated, if a number of tokens in the first accumulator is greater than zero. The number of tokens is subtracted from the second accumulator, and a default priority assigned to the queue, if the number of tokens in the first accumulator is less than zero and a number of tokens in the second accumulator is greater than zero. The network resource is assigned for transmission of the packet from the queue using a schedule that is based on the priority assigned to the queue. The packet is transmitted using the assigned network resource.

DETAILED DESCRIPTION

This description of the exemplary embodiments is intended to be read in connection with the accompanying drawings, which are to be considered part of the entire written description.

Figure 1:
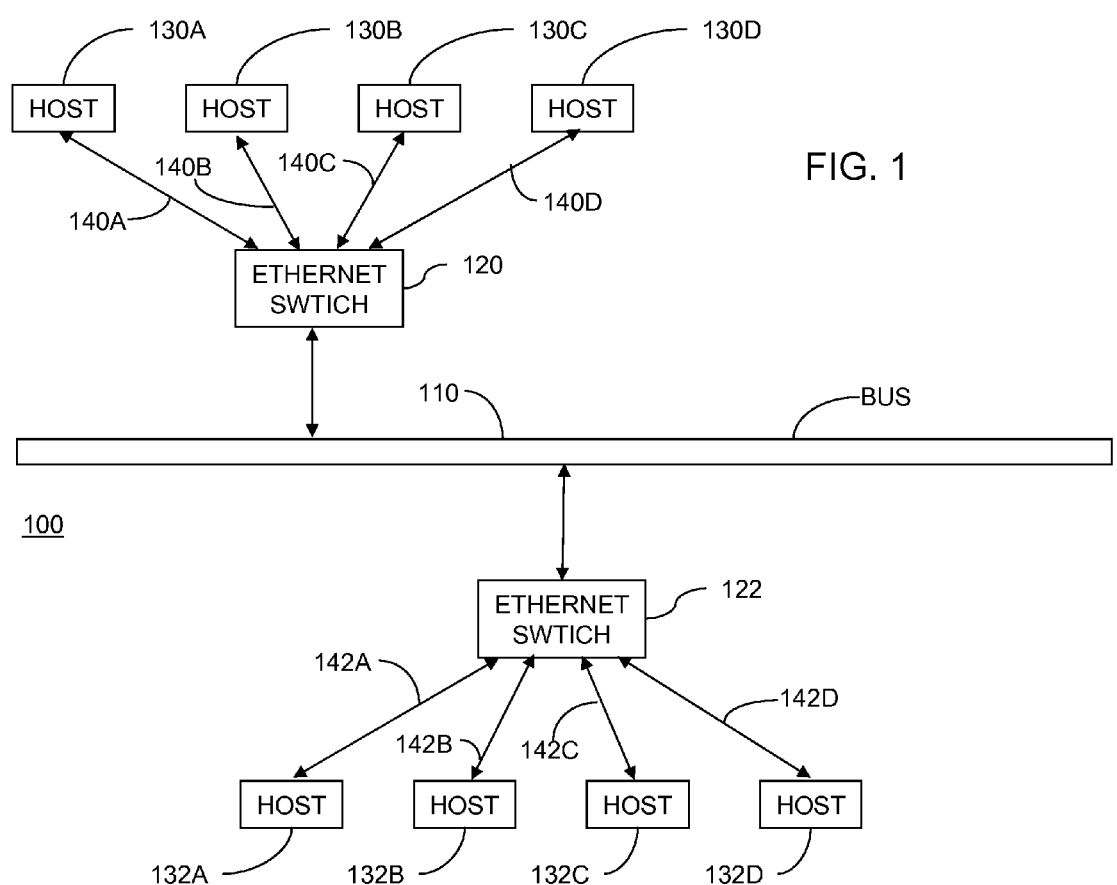
FIG. 1 is a block diagram of an exemplary network in which embodiments of the invention may be used.

FIG. 1 is a block diagram of an exemplary system in which embodiments of the invention may be used. A LAN 100 includes an Ethernet bus 110 and one or more Ethernet switches 120, 122. Other nodes (not shown) such as host computers, Ethernet hubs, switches, multiplexers, IP routers, wireless routers, or the like, may be coupled to the bus 110 directly via wired links, or indirectly coupled via wireless links. In the example of LAN 100, each switch 120, 122 has a plurality of hosts 130A-130D, 132A-132D, respectively connected thereto via links 140A-140D, 142A-142D, respectively. Although FIG. 1 shows an Ethernet LAN, other embodiments include other types of networks (e.g., ATM networks) and other types of network resources.

Figure 2:
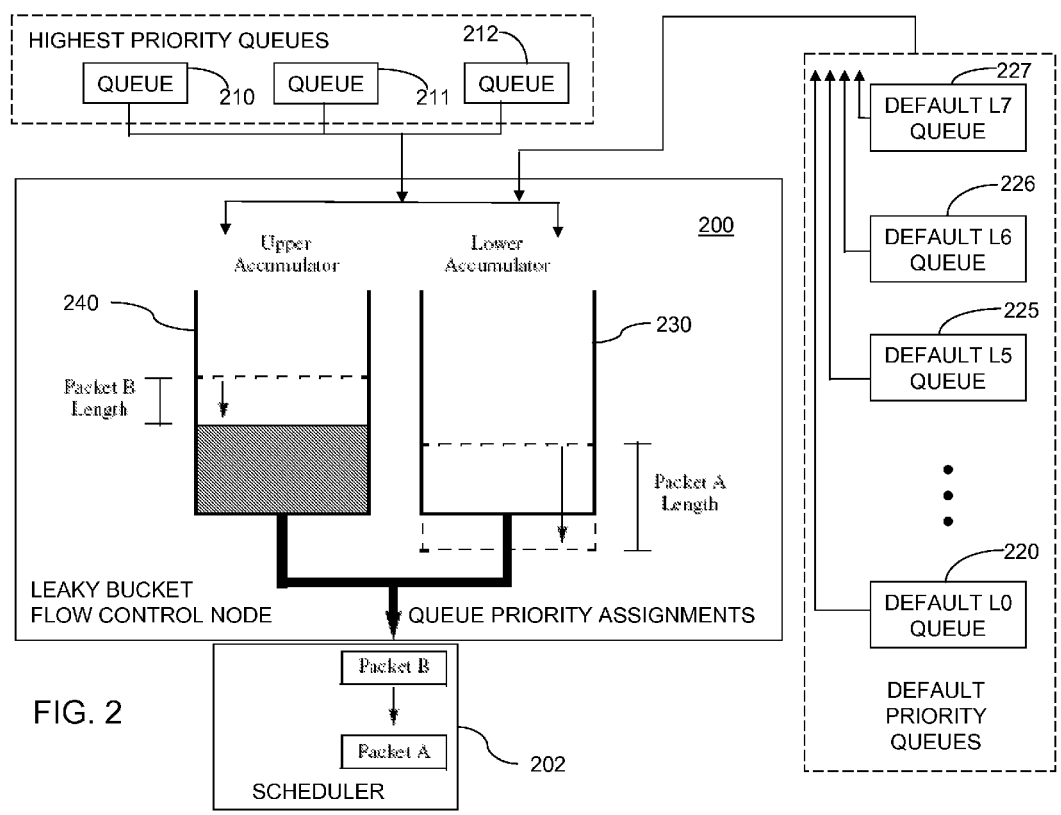
FIG. 2 is a schematic block diagram of a leaky bucket flow control node, which can be used in the network of FIG. 1.

FIG. 2 is a schematic block diagram of a leaky bucket flow control node 200, which may be included in LAN 100. The leaky bucket flow control node 200 may be a host, a multiplexer, an Ethernet switch, or other type of switch. The leaky bucket flow control node 200 includes two token leaky bucket accumulators 230, 240. Both accumulators 230, 240 are coupled to receive requests for a network resource (e.g., an Ethernet switch or a line) from a plurality of requesters. These requesters may include a plurality of queues 210-212 assigned to the highest priority level, and a plurality of queues 220-227 assigned to their respective default priority levels.

Although FIG. 2 only shows one lower accumulator 230 and one upper accumulator 240, it will be understood that there is a respective lower accumulator 230 and a respective upper accumulator for each queue 210-212 and 220-227. Further, although FIG. 2 shows three of the queues 210-212 assigned to the highest priority level, the number of queues having the highest priority level varies from zero (when all queues are being serviced with at least the minimum prescribed bandwidth) to the total number of queues (if none of the queues is receiving at least the minimum prescribed bandwidth), and may be any number of queues in between.

For queues 210-212 and 220-227, prescribed egress bandwidths (e.g., in an Ethernet switch) are achieved with a dual leaky bucket approach and a dual arbitration scheme. One bucket (lower accumulator 230) measures minimum bandwidth that is to be met. The other bucket (upper accumulator 240) measures maximum bandwidth that should not be exceeded.

An exemplary embodiment described below links the two leaky bucket accumulators 230, 240 so that conceptually, they operate like a single leaky bucket. Tokens (corresponding to packets being transmitted) are drained from the lower leaky bucket accumulator 230 first, until the lower accumulator is empty. Additional tokens (corresponding to additional packets being transmitted) are then drained from the upper leaky bucket accumulator 240, without continuing to subtract tokens from the lower accumulator 230.

The lower accumulator 230 has a relatively small maximum positive number of tokens for each queue 210-212, 220-227, corresponding to a minimum bandwidth for that queue. When the number of tokens in the lower accumulator 230 reaches the number corresponding to the minimum prescribed bandwidth, then the number of tokens in the lower accumulator 230 is not increased beyond that maximum number, and additional tokens are discarded. The upper accumulator 240 has a relatively large maximum number of tokens for each queue, equal to the difference between the maximum bandwidth and the minimum bandwidth for each queue. When the number of tokens in the upper accumulator 240 reaches the number corresponding to the maximum bandwidth, then the number of tokens in the upper accumulator 240 is not increased beyond that maximum number, and additional tokens are discarded, until some of the tokens are subtracted from the upper accumulator 240.

This avoids inaccuracy in the rate measuring under various traffic patterns.

The dual arbitration scheme provides a bounded scheduling latency for any particular queue 210-212 or 220-227 by combining two simple arbitration methods (round robin and strict priority).

During each interval, network resources are scheduled based on the queue status for each priority level. Queues are serviced according to strict priority by default. Each application is assigned a default priority level at the time that a connection is set up for that application. In some embodiments, there are eight default priority levels, ranging from the lowest default priority (0) to the highest default priority (7). In other embodiments, any desired number of default priority levels may be used.

In one embodiment having eight default priority levels, the priority-7 queue is serviced until it is exhausted, then priority-6 queue is serviced until it is exhausted, then queue 5 is serviced until it is exhausted, and so on, until the priority-0 queue is serviced.

If a queue assigned to any of the default priority levels has not met its prescribed minimum rate, the priority of the queue is elevated to the highest priority (e.g., level 8) at which time the elevated priority queues 210-212 are serviced using a round-robin scheme until their minimum rates have been achieved.

Two shapers (accumulators 230 and 240) per queue are provided in order to achieve both egress rate shaping and to make sure that a prescribed bandwidth (as determined at connection setup time) is provided.

Tokens are added to both accumulators 230, 240 at a periodic rate with a value defined by the upper and lower deltas. Each token represents one byte of a packet. As packets are scheduled, tokens are drained from the accumulators. Since the accumulator update period is constant, these delta values determine the scheduling rates being measured in both shapers 230 and 240 for that particular queue.

Queue priorities are evaluated at every scheduling and accumulator update interval for all queues 210-212, and 220-227. All tokens are accounted for in both accumulators 230 and 240, because the lower accumulator is never driven to the negative limit of the binary counter for the lower leaky bucket. Thus, the state of the accumulators accurately identifies whether the maximum and minimum rates have been exceeded.

Three conditions are evaluated.

(a) If the number of tokens in the lower accumulator 230 is positive and the number of tokens in the upper accumulator 240 is full (i.e., has reached its upper limit), the minimum rate has not been exceeded and the priority of the queue is immediately elevated to the highest priority.

(b) If the number of tokens in the lower accumulator 230 is negative, and the number of tokens in the upper accumulator 240 is positive, the minimum rate has been achieved and the queue is assigned its default priority.

(c) If the number of tokens in the lower accumulator 230 is negative, and the number of tokens in the upper accumulator 240 is negative, the maximum rate has been exceeded and the queue is removed from arbitration until it becomes positive again after an update period.

After the priority evaluation and assignments have taken place, the arbitration of the queues can occur.

Since tokens are logically shared between the two shapers 230 and 240, the state of the minimum and maximum rates (i.e. met, not met) can be inferred from the level of the two accumulators taken together.

Bandwidth agreements (with each application) are met by elevating a queue to the highest priority, if the minimum rate defined by the lower shaper (leaky bucket accumulator 230) has not been achieved. The priority-elevated queues 210-212 are serviced in a round-robin fashion by the scheduler until their minimum rates have been satisfied. When the minimum rate for a given queue has been satisfied, the associated priority for that queue is lowered to the default value for that queue.

Any of the default priority queues 220-227 that have met their minimum rate are serviced with a strict priority arbitration scheme. All data in the priority level 7 queues are transmitted, then all data in the priority level 6 queues are transmitted, and so forth, until data in the priority level 0 queues are transmitted.

Using a round-robin arbitration for the elevated-priority queues 210-212 ensures a bounded scheduling latency for queues that have not met their prescribed minimum rate. This combination of strict priority and round-robin arbitration can ensure that the prescribed bandwidth is met over a long-term period for each queue.

Figure 3:
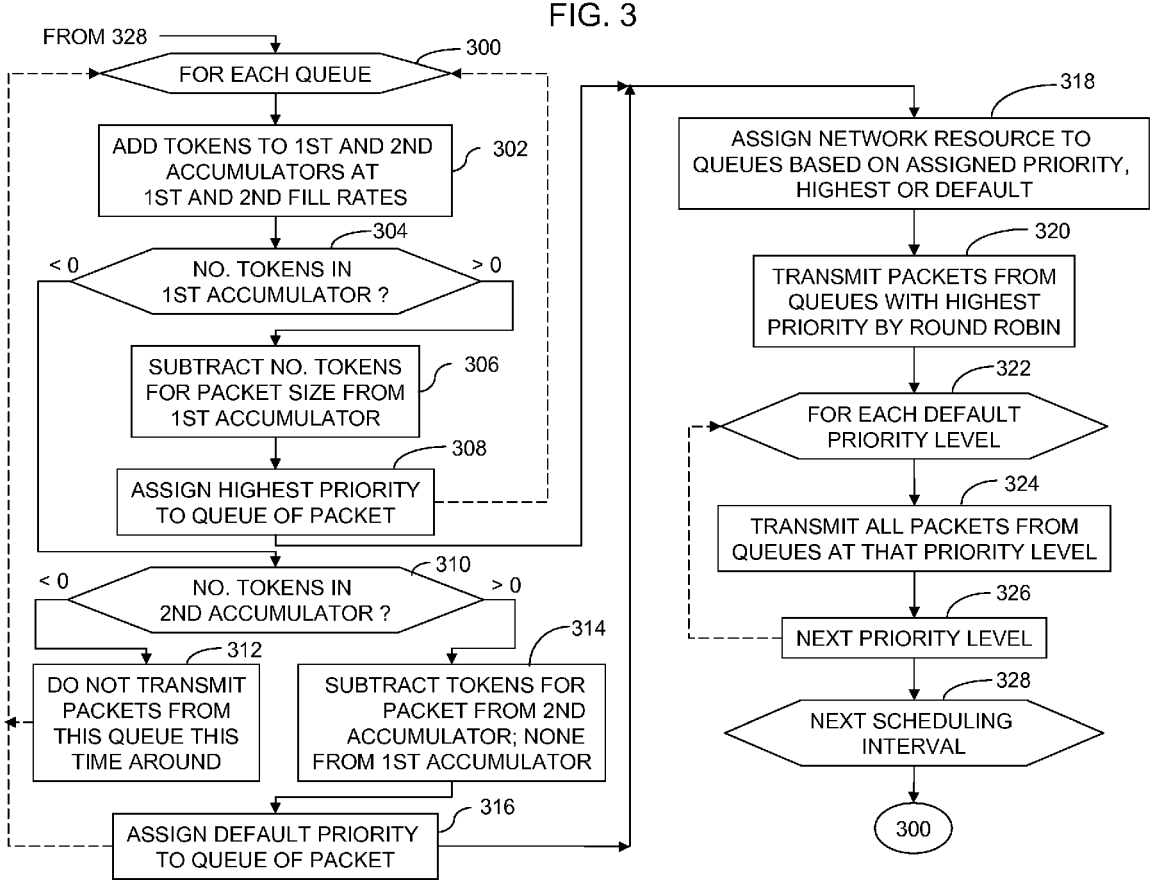
FIG. 3 is a flow chart of a method for assigning queues to priority levels, and servicing the queues.

FIG. 3 is a flow chart diagram of an exemplary method. The steps 300 to 328 are repeated for each scheduling interval.

At step 300, the loop from steps 302 to 316 is performed for each respective queue.

At step 302, tokens are added to each of the first and second leaky bucket accumulators 230 and 240 at the fill rate for each accumulator. Each accumulator 230, 240 has a maximum positive number of tokens. Once an accumulator 230 or 240 has reached its respective maximum number of tokens, the number of tokens in that accumulator does not increase again until after some of the tokens have been removed from that accumulator. The number of tokens in each accumulator can, however, decrease past zero, and is permitted to reach negative values.

At step 304, when one of the queues requires access to the network resource, both upper and lower token leaky bucket shapers 230 and 240 assigned to a particular queue can be viewed conceptually as one leaky bucket. When packets are scheduled, a determination is made from which accumulator 230 or 240 to subtract tokens. If the number of tokens in the first accumulator 230 is greater than zero (i.e., if the minimum bandwidth is not met), then step 306 is performed. If the number of tokens in the first accumulator 230 is less than zero (i.e., if the bandwidth greater than the minimum), then step 310 is performed.

At step 306, a number of tokens corresponding to the packet length is subtracted from the lower accumulator 230. Tokens are subtracted from the lower accumulator 230 during the initial iterations of the loop from steps 300 to 308 so long as the value of the accumulator 230 (the number of token s in the accumulator) is positive.

At step 308, the queue is assigned to the highest priority level.

At the conclusion of step 308, if there are more queues to schedule, then the loop beginning at step 300 is performed again.

Step 310 is executed when the minimum rate is known to be met (i.e., when the number of tokens in the first accumulator 230 is negative, as determined at step 304). In step 310, a determination is made whether the number of tokens in the second leaky bucket accumulator 240 is greater or less than zero. If the number of tokens in accumulator 240 is greater than zero (the bandwidth for this queue is between the minimum and maximum values), step 314 is executed. If the number of tokens in accumulator 240 is less than zero (the maximum bandwidth for this queue has been met), step 312 is executed.

At step 314, tokens corresponding to additional packets scheduled for this queue are removed from the upper accumulator 240, which then limits the maximum rate of the queue. None of the packets for this queue are removed from the first accumulator 230 while the number of tokens in the first accumulator is negative (i.e., while the minimum bandwidth is being met).

At step 316, while the bandwidth is between the minimum and maximum values, the queue is assigned to its default priority level. The default priority level for each queue is determined at connection setup time, and can be determined based on the application type, the quality of service (QoS) to which the network and the application agree, and/or other factors.

At the conclusion of step 316, if there are additional queues to be scheduled, then control passes to step 300.

At step 312, if the number of tokens in the second (upper) accumulator 240 is negative (i.e., if the maximum bandwidth has been met), then no packets from this queue are scheduled during this iteration of the scheduling loop. The queue is removed from arbitration until the number of tokens in the upper accumulator 240 turns positive.

At the conclusion of step 312, if there are additional queues to be scheduled, then control passes to step 300.

When the scheduling loop comprising steps 300-316 is completed for each queue, step 318 is performed. At step 318, the network resource is assigned to transmit packets from the various queues, based on the assigned priority level of each queue.

At step 320, the packets are transmitted from the highest priority queue(s). If there is currently a single queue assigned to the highest priority level, packets are transmitted from that queue for each scheduling interval, until the queue is exhausted or the number of tokens in the lower accumulator 230 is negative (in which case the priority of the queue returns to its default priority level). If there are multiple queues with the highest priority level, packets from these queues are sent in round-robin fashion until each queue is exhausted or the number of tokens in the lower accumulator 230 for each queue is negative.

At steps 322 to 326, a loop is repeated for each default priority level. By default, queues are handled in a strict priority fashion where the highest priority queue is serviced until the queue is exhausted. The next highest priority queue is then serviced until it is exhausted and so on. In the case where minimum rates are not met for any given queue, the given queue is elevated to the highest priority and preempt the strict priority arbitration mechanism with a round-robin servicing scheme. The elevated priority queues are serviced in a round-robin fashion until their prescribed minimum rates are met, at which time their priorities are lowered back to their default levels. All high priority queues are serviced first, and then the default priority queues are serviced.

This dual arbitration approach allows for a "low latency queue" assignment to any queue that is rate-starved. The scheduling latency for these high priority queues is bounded, and can be quantified to the time division multiplexed (TDM) period for each scheduling interval. This bounded latency coupled with the priority evaluation scheme allows for guaranteed bandwidth.

Exemplary pseudocode for an embodiment is provided below. One of ordinary skill in the art can readily understand an exemplary program flow from the pseudocode below, and the description above.

```
reg [7:0] q_empty; // q status; q7 has the highest priority; q0 lowest
reg [n:0] lower_shaper[7:0]; // lower shaper accumulator
reg [n:0] upper_shaper[7:0]; // upper shaper accumulator
reg [n:0] minimum[7:0]; // minimum rate
reg [n:0] maximum[7:0]; // maximum rate
reg [15:0] q_req; // q request
reg [7:0] last_priority; // last priority; 1: high, 0: low
reg [2:0] last_q_sel; // last serviced q
// for every bucket filling interval; do the following
for (i=0; i<8; i=i+1) begin
    lower_shaper[i] = lower_shaper[i] +minimum[i];
    upper_shaper[i] = upper_shaper[i] + (maximum[i] −minimum[i]);
end
// for every scheduling interval, do the following
for (i=0; i<8; i=i+1) begin
    if ((upper_shaper[i] ==upper_limit[i])&&(lower_shaper[i]>0))
    begin // < minimum
        q_req[i] = 0;
        q_req[i+8] = 1;
```

-continued

```
    end
    else if ((upper_shaper[i]<upper_limit[i])&&(upper_shaper[i]>0))
begin// > minimum < maximum
        q_req[i] = 1;
        q_req[i+8] = 0;
    end
    else begin // > maximum
        q_req[i] = 0;
        q_req[i+8] = 0;
    end
end
wire [2:0] rot_cnt = 8-last_q_sel; // rotate q_req[15:8]
wire [2:0] rot_q_req2 = rot_cnt[2]?{q_req[11:8],
q_req[15:12]}:q_req[7:0];
wire [2:0] rot_q_req1 = rot_cnt[1]?{rot_q_req2[5:0],
rot_q_req2[7:6]}:rot_q_req2[7:0];
wire [2:0] rot_q_req = rot_cnt[0]?{rot_q_req1[6:0],
rot_q_req1[7]}:rot_q_req1[7:0];
reg [2:0] rot_q_sel;
case (1) // round robin for q < minimum
    rot_q_req[7]: rot_q_sel = 7;
    rot_q_req[6]: rot_q_sel = 6;
    rot_q_req[5]: rot_q_sel = 5;
    rot_q_req[4]: rot_q_sel = 4;
    rot_q_req[3]: rot_q_sel = 3;
    rot_q_req[2]: rot_q_sel = 2;
    rot_q_req[1]: rot_q_sel = 1;
    rot_q_req[0]: rot_q_sel = 0;
end
wire [2:0] h_q_sel = rot_q_sel+last_q_sel;
last_q_sel = h_q_sel;
reg [2:0] l_q_sel;
case (1) // strict priority for q > minimum
    q_req[7]: l_q_sel = 7;
    q_req[6]: l_q_sel = 6;
    q_req[5]: l_q_sel = 5;
    q_req[4]: l_q_sel = 4;
    q_req[3]: l_q_sel = 3;
    q_req[2]: l_q_sel = 2;
    q_req[1]: l_q_sel = 1;
    q_req[0]: l_q_sel = 0;
endcase
wire [2:0] q_sel = |q_req[15:8]?h_q_sel:l_q_sel;
if (~q_empty[q_sel]) begin
    if (lower_shaper[q_sel]>0) // drain lower first
        lower_shaper[q_sel] = lower_shaper[q_sel]-pkt_length[q_sel];
    else begin // drain upper
        upper_shaper[q_sel]= upper_shaper[q_sel]-pkt_length[q_sel];
    end
    // next, schedule the packet from the selected queue
end
```

Example

Figure 4A:
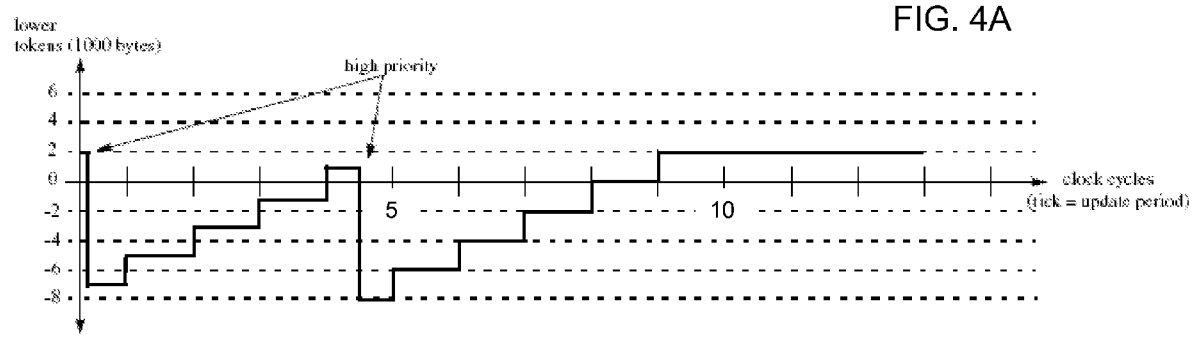
FIGS. 4A and 4B are diagrams showing the fill states of the lower and upper token leaky bucket accumulators of FIG. 2 during an exemplary packet transmission.
Figure 4B:
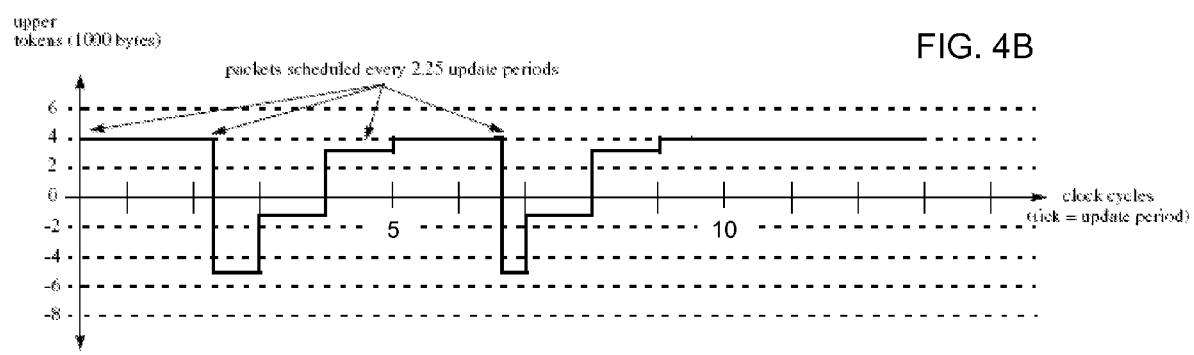

FIGS. 4A and 4B show the lower and upper accumulator states for a case in which four 9K packets are scheduled back-to-back by way of the same queue. The update period for the accumulators is 7000 clock cycles. The maximum transmission rate is roughly 4000 bytes per accumulator update cycle, so it takes approximately 2¼ update periods, or 18,000 cycles to process one 9K packet.

In this example, the upper shaper's delta/limits are set to 4000, or the maximum rate allowed.

The minimum rate is set to 2000, which equates to about half of the maximum rate. Since only the first packet is sent at high priority, the next high priority packet occurs at (2×2¼) update periods which equates to every other packet, or half of the maximum rate which is exactly what is expected.

The linked approach to the token accounting described above serves to unify the two physically separate accumulators 230, 240 into one logical leaky bucket. The lower shaper 230 ensures a minimum packet rate is achieved while the upper shaper 240 places an upper bound on the <maximum-minimum> packet rate.

This token accounting method prevents inaccuracy in the lower shaper 230, because all tokens are always accounted for in any scenario. Accumulator accuracy allows the queue priority to be determined correctly.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for scheduling a network resource, comprising the steps of:
    (a) adding tokens to first and second accumulators at first and second fill rates, respectively;
    (b) subtracting a number of tokens corresponding to a size of a packet from the first accumulator and assigning a highest priority to a queue with which the packet is associated, if a number of tokens in the first accumulator is greater than zero;
    (c) subtracting the number of tokens corresponding to the size of the packet from the second accumulator, and assigning a default priority to the queue, if the number of tokens in the first accumulator is less than zero and a number of tokens in the second accumulator is greater than zero;
    (d) assigning the network resource for transmission of the packet from the queue using a schedule that is based on the priority assigned to the queue; and
    (e) transmitting the packet using the assigned network resource, wherein, for each packet to be transmitted, either step (b) or step (c) is performed, but not both.

2. The method of claim 1, wherein packets from a plurality of queues are scheduled for transmission using the network resource, and steps (a), (b) and (c) are repeated for each respective queue.

3. The method of claim 2, wherein step (d) comprises:
    scheduling the network resource to transmit all the packets from a first one of the queues with the highest priority before the network resource transmits packets from a second one of the queues with the default priority.

4. The method of claim 3, wherein:
    two or more of the plurality of queues have respective default priorities, including a queue with a first default priority and a queue with a second default priority that is lower than the first default priority, and
    step (d) comprises scheduling the network resource to transmit all the packets from the queue with the first default priority before the network resource transmits packets from the queue with the second default priority.

5. The method of claim 4, wherein two or more of the plurality of queues have the highest priority, and step (d) includes:
    scheduling all the respective packets from the two or more queues having the highest priority according to a round-robin schedule before transmitting any packets from the queues having default priorities.

6. The method of claim 2, wherein two or more of the plurality of queues have the highest priority, and step (d) includes scheduling respective packets from the two or more queues having the highest priority according to a round-robin schedule.

7. The method of claim 2, further comprising scheduling the network resource to transmit packets from other ones of the plurality of queues, without scheduling the network resource to transmit further packets from the first one of the plurality of queues, if the number of tokens in the second accumulator corresponding to the first one of the plurality of queues is less than zero.

8. The method of claim 2, wherein two or more of the plurality of queues have the highest priority, and step (d) includes:
scheduling transmission of respective packets from the two or more queues having the highest priority according to a strict priority schedule.

9. The method of claim 1, wherein the network resource is one of the group consisting of a switch and a line.

10. The method of claim 1, wherein the network resource is an Ethernet switch.

11. The method of claim 1, wherein, for step (c), the number of tokens in the second accumulator becomes less than zero after the number of tokens corresponding to the size of the packet has been subtracted.

12. The method of claim 1, further comprising at least one of:
discarding tokens intended for the first accumulator if a number of tokens accumulated in the first accumulator is at a first specified maximum number; and
discarding tokens intended for the second accumulator if a number of tokens accumulated in the second accumulator is at a second specified maximum number.

13. The method of claim 12, wherein:
the first specified maximum number corresponds to a minimum bandwidth for the queue; and
the second specified maximum number corresponds to a difference between the minimum bandwidth and a maximum bandwidth for the queue.

14. The method of claim 1, wherein the first accumulator and the second accumulator operate as a single leaky bucket, wherein tokens are being subtracted from the first accumulator using step (b) until the first accumulator becomes empty, and then tokens are being subtracted from the second accumulator using step (c) without continuing to subtract tokens from the empty first accumulator.

15. A system for scheduling a network resource, comprising:
a first accumulator and a second accumulator, to which tokens are added at first and second fill rates, respectively; and
a storage portion containing a queue, the queue having a packet,
wherein a number of tokens corresponding to a size of the packet is subtracted from the first accumulator, and a highest priority is assigned to the queue, if a number of tokens in the first accumulator is greater than zero, and
the number of tokens corresponding to the size of the packet is subtracted from the second accumulator, and a default priority is assigned to the queue, if the number of tokens in the first accumulator is less than zero and a number of tokens in the second accumulator is greater than zero;
a scheduler that schedules the network resource for transmission of the packet from the queue using a schedule that is based on the priority assigned to the queue, wherein, for each packet to be transmitted, the number of tokens corresponding to the size of the packet is subtracted either from the first accumulator or from the second accumulator, but not from both.

16. The system of claim 15, wherein the system includes a plurality of storage portions, each having a respective queue, and the first accumulator and the scheduler are used to schedule packets from each queue for transmission using the network resource.

17. The system of claim 16, wherein the scheduler schedules the network resource to transmit all the packets from a first one of the queues with the highest priority before the network resource transmits packets from a second one of the queues with the default priority.

18. The system of claim 15, wherein the network resource is an Ethernet switch.

19. The system of claim 15, wherein the storage portion is configured to allow the number of tokens in the second accumulator to become less than zero after the number of tokens corresponding to the size of the packet has been subtracted from the second accumulator.

20. The system of claim 15, wherein the storage portion is configured to:
discard tokens intended for the first accumulator if a number of tokens accumulated in the first accumulator is at a first specified maximum number; and
discard tokens intended for the second accumulator if a number of tokens accumulated in the second accumulator is at a second specified maximum number.

21. The system of claim 20, wherein:
the first specified maximum number corresponds to a minimum bandwidth for the queue; and
the first specified maximum number corresponds to a difference between the minimum bandwidth and a maximum bandwidth for the queue.

22. The system of claim 15, wherein the system is configured to operate the first accumulator and the second accumulator as a single leaky bucket, wherein tokens are being subtracted from the first accumulator until the first accumulator becomes empty, and then tokens are being subtracted from the second accumulator without continuing to subtract tokens from the empty first accumulator.

23. A non-transitory computer readable medium encoded with computer program code, wherein when the computer program code is executed by a processor, the processor performs a method for scheduling a network resource, comprising the steps of:
(a) adding tokens to first and second accumulators at first and second fill rates, respectively;
(b) subtracting a number of tokens corresponding to a size of a packet from the first accumulator, and assigning a highest priority to a queue with which the packet is associated, if a number of tokens in the first accumulator is greater than zero;
(c) subtracting the number of tokens corresponding to the size of the packet from the second accumulator, and assigning a default priority to the queue, if the number of tokens in the first accumulator is less than zero and a number of tokens in the second accumulator is greater than zero;
(d) assigning the network resource for transmission of the packet from the queue using a schedule that is based on the priority assigned to the queue, wherein, for each packet to be transmitted, either step (b) or step (c) is performed, but not both.

24. The non-transitory computer readable medium of claim 23, wherein packets from a plurality of queues are scheduled for transmission using the network resource, and steps (a), (b) and (c) are repeated for each respective queue.

25. The non-transitory computer readable medium of claim 24, wherein step (d) comprises:
scheduling the network resource to transmit all the packets from a first one of the queues with the highest priority before the network resource transmits packets from a second one of the queues with the default priority.

26. The non-transitory computer readable medium of claim 25, wherein two or more of the plurality of queues have the highest priority, and step (d) includes scheduling respective packets from the two or more queues having the highest priority according to a round-robin schedule.

27. The non-transitory computer readable medium of claim 23, wherein, for step (c), the number of tokens in the second accumulator becomes less than zero after the number of tokens corresponding to the size of the packet has been subtracted.

28. The non-transitory computer readable medium of claim 23, wherein the method further comprises at least one of:
   discarding tokens intended for the first accumulator if a number of tokens accumulated in the first accumulator is at a first specified maximum number; and
   discarding tokens intended for the second accumulator if a number of tokens accumulated in the second accumulator is at a second specified maximum number.

29. The non-transitory computer readable medium of claim 28, wherein:
   the first specified maximum number corresponds to a minimum bandwidth for the queue; and
   the second specified maximum number corresponds to a difference between the minimum bandwidth and a maximum bandwidth for the queue.

30. The non-transitory computer readable medium of claim 23, wherein the first accumulator and the second accumulator operate as a single leaky bucket, wherein tokens are being subtracted from the first accumulator using step (b) until the first accumulator becomes empty, and then tokens are being subtracted from the second accumulator using step (c) without continuing to subtract tokens from the empty first accumulator.

31. A method for scheduling a network resource, comprising the steps of:
   (a) adding tokens to first and second accumulators at first and second fill rates, respectively;
   (b) subtracting a number of tokens corresponding to a size of a packet from the first accumulator and assigning a highest priority to a queue with which the packet is associated, if a number of tokens in the first accumulator is greater than zero;
   (c) subtracting the number of tokens from the second accumulator, and assigning a default priority to the queue, if the number of tokens in the first accumulator is less than zero and a number of tokens in the second accumulator is greater than zero;
   (d) assigning the network resource for transmission of the packet from the queue using a schedule that is based on the priority assigned to the queue; and
   (e) transmitting the packet using the assigned network resource; and
   further comprising at least one of:
      discarding tokens intended for the first accumulator if a number of tokens accumulated in the first accumulator is at a first specified maximum number; and
      discarding tokens intended for the second accumulator if a number of tokens accumulated in the second accumulator is at a second specified maximum number,
      wherein:
         the first specified maximum number corresponds to a minimum bandwidth for the queue; and
         the second specified maximum number corresponds to a difference between the minimum bandwidth and a maximum bandwidth for the queue.

* * * * *